United States Patent
Yu et al.

(10) Patent No.: US 6,271,865 B1
(45) Date of Patent: Aug. 7, 2001

(54) CELLULAR PHONE HANDSET WHICH CAN DISPLAY SPECIAL CHARACTERS

(75) Inventors: Chi-Huang Yu; Wen-Jui Hsieh, both of Taipei (TW)

(73) Assignee: Acer Peripherals, Inc., Taoyuan (TW)

( * ) Notice: Subject to any disclaimer, the term of this patent is extended or adjusted under 35 U.S.C. 154(b) by 0 days.

(21) Appl. No.: 09/100,642

(22) Filed: Jun. 19, 1998

(30) Foreign Application Priority Data

Feb. 25, 1998 (TW) .................................................. 87102684

(51) Int. Cl.[7] .................................................. G06T 11/00
(52) U.S. Cl. .................................................. 345/467; 455/557
(58) Field of Search .................................................. 455/419, 418, 455/566, 556, 557; 235/380; 314/22; 345/467, 471

(56) References Cited

U.S. PATENT DOCUMENTS

| | | | |
|---|---|---|---|
| 5,633,484 | * | 5/1997 | Zancho .................................................. 235/380 |
| 5,786,776 | * | 7/1998 | Kisaichi .................................................. 341/23 |
| 5,920,826 | * | 7/1999 | Metso .................................................. 455/557 |

OTHER PUBLICATIONS

Vardaman, Jan E., Electronic Engineering Times, 1995, n 850, PG70.*
Cassel, Jonathan, Electronic Buyer's News, 1933, n 865, PG14.*
Mayer, John H., Electronic Buyer's News, 1997, n 1085, PG 52.*

* cited by examiner

Primary Examiner—Matthew Luu
(74) Attorney, Agent, or Firm—Winston Hsu

(57) ABSTRACT

The present invention provides a cellular phone handset which can display a variety of special characters. The cellular phone handset comprises a memory for storing programs and data, a processor for executing the programs stored in the memory, a displaying device electrically connected to the processor for displaying data, an input/output (I/O) port electrically connected with the processor for connecting to a stand alone data editing device for transmitting data, a data file inputted through the I/O port and stored in the memory comprising a plurality of common character codes and specific character codes, a common character font file stored in the memory comprising a plurality of common character font data, a specific character font file inputted through the I/O port and stored in the memory comprising specific character font data corresponding to the specific character codes of the data file, and an application program stored in the memory for displaying characters of the common character codes in the data file on the displaying device according to the common character font file, and characters of the specific character codes in the data file on the displaying device according to the specific character font file.

6 Claims, 1 Drawing Sheet

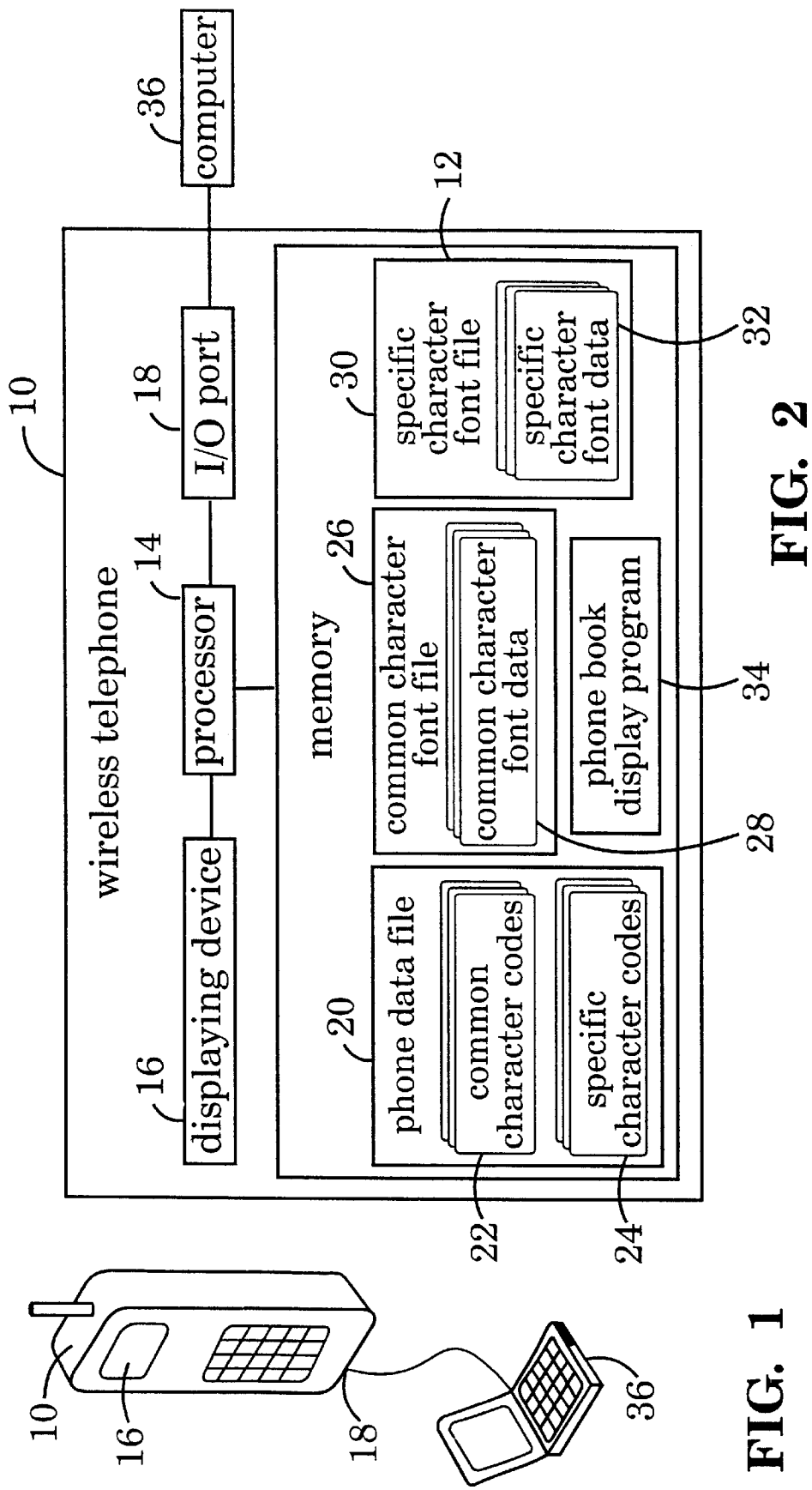

CELLULAR PHONE HANDSET WHICH CAN DISPLAY SPECIAL CHARACTERS

BACKGROUND OF THE INVENTION

1. Field of the Invention

The present invention relates to a cellular phone handset, and more particularly, to a cellular phone handset which can display a variety of special characters.

2. Description of the Prior Art

Many cellular phone handsets such as a GSM (Global System of Mobile communications) wireless handset can function as a phone book. A handset which serves this function usually stores a few thousand frequently used Chinese characters in its memory. However, most of the characters stored in the memory may rarely or never be used, thus they waste a lot of memory space. On the other hand, if a user needs to use a Chinese character which is not pre-stored in the memory, the cellular phone handset won't be able to display the character correctly. Besides, if the user needs to use other kinds of graphic characters such as Japanese, Korean or simplified Chinese, other fonts of characters or special symbols and graphics, the handset cannot store all these characters and symbols into its limited memory. Even if the handset has stored a lot of character data in its memory, it still cannot meet all users' different needs. Therefore, using the memory more efficiently becomes an important issue.

A good cellular phone handset has to be compact, thus it is sometimes connected to a computer for editing its phone book. The computer uses its I/O device to provide a better data editing interface for the handset. After the phone book data has been edited, the computer will transmit the generated character codes through its I/O port to the handset. The handset then retrieves character fonts from its memory according to the received character codes, and displays the characters on a displaying device such as an LCD. If some special characters, fonts or symbols are not pre-stored in the memory of the handset, the handset cannot correctly display the special characters, fonts or symbols.

SUMMARY OF THE INVENTION

It is therefore an objective of the present invention to provide a cellular phone handset which can display a wide variety of characters to solve the above mentioned problem.

It is therefore another objective of the present invention that the cellular phone handset is fairly compact to solve the above mentioned problem.

In a preferred embodiment, the present invention provides a cellular phone handset comprising:

a memory for storing programs and data;

a processor for executing the programs stored in the memory;

a displaying device electrically connected to the processor for displaying data;

an input/output (I/O) port electrically connected with the processor for connecting to a stand alone data editing device for transmitting data;

a data file inputted through the I/O port and stored in the memory comprising a plurality of common character codes and specific character codes;

a common character font file stored in the memory comprising a plurality of common character font data;

a specific character font file inputted through the I/O port and stored in the memory comprising specific character font data corresponding to the specific character codes of the data file; and an application program stored in the memory for displaying characters of the common character codes in the data file on the displaying device according to the common character font file, and characters of the specific character codes in the data file on the displaying device according to the specific character font file.

It is an advantage of the present invention that the cellular phone handset can display different kinds of graphic characters, fonts, symbols, and graphics to meet the demand of a user.

It is another advantage of the present invention that the memory of the cellular phone handset is kept small so that the handset could be very compact.

These and other objectives of the present invention will no doubt become obvious to those of ordinary skill in the art after reading the following detailed description of the preferred embodiment which is illustrated in the various figures and drawings.

BRIEF DESCRIPTION OF THE DRAWINGS

FIG. 1 is a perspective view of a cellular phone handset and a computer according to the present invention.

FIG. 2 is a function block diagram of the cellular phone handset in FIG. 1.

DETAILED DESCRIPTION OF THE PREFERRED EMBODIMENT

Please refer to FIG. 1 and FIG. 2. FIG. 1 is a perspective view of a cellular phone handset 10 and a computer 36 according to the present invention. FIG. 2 is a function block diagram of the cellular phone handset 10. The cellular phone handset 10 comprises a memory 12 for storing programs and data, a processor 14 for executing the programs stored in the memory 12, a displaying device 16 electrically connected with the processor 14 for displaying data, an input/output (I/O) port 18 electrically connected with the processor 14 for connecting to a stand alone computer 36 for transmitting data, a phone data file 20 inputted through the I/O port 18 and stored in the memory 12 comprising a plurality of common character codes 22 and specific character codes 24, a common character font file 26 stored in the memory 12 comprising a plurality of common character font data 28, a specific character font file 30 inputted through the I/O port 18 and stored in the memory 12 comprising a plurality of specific character font data 32 corresponding to the specific character codes 24 in the phone data file 20, and a phone book display program 34 stored in the memory 12 for displaying characters corresponding to the common character codes 22 in the phone data file 20 on the displaying device 16 according to the common character font file 26, and characters corresponding to the specific character codes 24 in the phone data file 20 on the displaying device 16 according to the specific character font file 30.

The common character font file 26 comprises common character font data 28 of commonly-used characters such as numbers, English alphabets, common symbols, and character data which are needed by the phone book display program 34. Most common character codes 22 in the phone data file 20 are used for representing numbers and symbols of a phone number. The specific character font file 30 comprises specific character font data 32 for representing specific character codes 24 in the phone data file 20 such as a name, company name, address, and remark. The specific character font file 30 can comprise many different fonts of characters, special symbols or graphics, and different graphic characters such as complex Chinese, simplified Chinese, Japanese, and Korean.

A user can use the computer 36 to retrieve the phone data file 20 and specific character font file 30 in the handset 10 through the I/O port 18, update the phone data file 20 and the specific character font file 30, then loaded the updated files 20, 30 back to the handset 10.

The operation details will be described herein. The computer 36 will first retrieve the phone data file 20 and specific character font file 30 from the handset 10. After the user has finished editing the phone book, the computer 36 will update the character codes 22, 24 in the phone data file 20 and update the specific character font data 32 in the specific character font file 30 according to the new phone book. If some characters are no more needed by the user, the character codes of these characters will be removed from the phone data file 20. If new characters are needed, the character codes of these new characters will be added to the phone data file. If the newly-added characters codes are specific character codes, in other words, their character font data are not pre-stored in the memory by the handset manufacturer, then the specific character font data 32 in the specific character font file 30 will also be updated. The updated phone data file 20 and the updated specific character font file 30 will then be loaded back to the handset 10 and stored in the memory 12. Since commonly-used characters are categorized as common characters and their font data have been pre-stored in the common character font file 26, the common character font file 26 will not be updated.

Since the specific character font file 30 is loaded to the handset 10 by the user instead of being pre-stored in the memory 12 by the handset manufacturer, lots of memory space is saved and the handset 10 can display various characters, fonts, symbols without limitation due to limited memory capacity. The use of the specific character codes 24 and specific character font file 30 enhances memory efficiency, and improves the displaying ability of the handset 10. The present invention can meet the user's demand for displaying various characters, fonts, special symbols and graphics on the handset 10, in the meanwhile this improvement does not require extra cost for large memory space installed in the handset 10.

In addition to the phone book display program 34, the present invention could also be applied to other applications which require displaying various characters, fonts, symbols and graphics on the handset. A schedule management program, which could be edited and display the daily schedule arranged by the user, is also an example.

It should be noted that the computer 36 could also be replaced by other editing devices, such as the personal digital assistant (PDA), which could perform editing function.

Those skilled in the art will readily observe that numerous modifications and alternations of the device may be made while retaining the teachings of the invention. Accordingly, the above disclosure should be construed as limited only by the metes and bounds of the appended claims.

What is claimed is:

1. A cellular phone handset comprising:

a memory for storing programs and data;

a processor for executing the programs stored in the memory;

a displaying device electrically connected to the processor for displaying data;

an input/output (I/O) port electrically connected with the processor for connecting to a stand alone data editing device for transmitting data;

a data file inputted through the I/O port and stored in the memory comprising a plurality of common character codes and specific character codes;

a common character font file stored in the memory comprising a plurality of common character font data;

a specific character font file inputted through the I/O port and stored in the memory comprising specific character font data corresponding to the specific character codes of the data file, wherein the specific character font data is changeable by the stand alone data editing device; and an application program stored in the memory for displaying characters of the common character codes in the data file on the displaying device according to the common character font file, and characters of the specific character codes in the data file on the displaying device according to the specific character font file.

2. The cellular phone handset of claim 1 wherein the stand alone data editing device is a computer.

3. The cellular phone handset of claim 1 wherein the data file is a phone data file comprising a plurality of phone numbers represented by the common character codes and a plurality of name data represented by the specific character codes wherein the application program is a phone book display program for displaying the phone numbers and name data in the phone data file on the displaying device.

4. The cellular phone handset of claim 1 wherein the stand alone data editing device can retrieve the data file through the I/O port, update the data file, and then load the data file back to the memory through the I/O port.

5. The cellular phone handset of claim 4 wherein the stand alone data editing device is a computer.

6. The cellular phone handset of claim 1 wherein the specific character font data stored in the specific character font file is complex Chinese, simplified Chinese, Japanese, Korean, special symbols or graphics.

* * * * *